(12) United States Patent
Makida et al.

(10) Patent No.: US 8,727,762 B2
(45) Date of Patent: May 20, 2014

(54) DIE PLATE FOR RESIN GRANULATION

(75) Inventors: Tetsuo Makida, Hiroshima (JP); Kenji Nishimoto, Hiroshima (JP); Osamu Sumida, Hiroshima (JP); Tomonori Hashimoto, Hiroshima (JP)

(73) Assignee: The Japan Steel Works, Ltd., Tokyo (JP)

( * ) Notice: Subject to any disclaimer, the term of this patent is extended or adjusted under 35 U.S.C. 154(b) by 0 days.

(21) Appl. No.: 13/525,749

(22) Filed: Jun. 18, 2012

(65) Prior Publication Data

US 2012/0321737 A1 Dec. 20, 2012

(30) Foreign Application Priority Data

Jun. 20, 2011 (JP) ................. 2011-136344

(51) Int. Cl.
*B29C 47/86* (2006.01)
(52) U.S. Cl.
USPC ............. 425/379.1; 425/382 R; 425/464
(58) Field of Classification Search
USPC ......... 425/378.1, 378.2, 379.1, 382 R, 382.2, 425/464
See application file for complete search history.

(56) References Cited

U.S. PATENT DOCUMENTS

| | | | |
|---|---|---|---|
| 4,187,067 A * | 2/1980 | Mizuno et al. | 425/313 |
| 4,541,792 A * | 9/1985 | Zakic | 425/143 |
| 4,934,916 A * | 6/1990 | Lambertus | 425/67 |
| 5,714,173 A * | 2/1998 | Matsuo | 425/67 |
| 5,989,009 A * | 11/1999 | Matsuo | 425/464 |
| 6,638,045 B2 * | 10/2003 | Yoshii et al. | 425/67 |
| 2001/0005516 A1 | 6/2001 | Yoshii et al. | |

FOREIGN PATENT DOCUMENTS

| | | |
|---|---|---|
| DE | 100 64 035 | 7/2001 |
| JP | 2010-23404 | 2/2010 |

OTHER PUBLICATIONS

Extended European Search Report issued Dec. 10, 2013 in corresponding European patent application No. 12 17 2750.

* cited by examiner

*Primary Examiner* — Yogendra Gupta
*Assistant Examiner* — Joseph Leyson
(74) *Attorney, Agent, or Firm* — Wenderoth, Lind & Ponack, LLP

(57) ABSTRACT

In order to ensure quality of pellets by eliminating temperature differences among extrusion nozzle holes with use of a heating medium flowing through heating channels only once and flowing out through a heating medium outlet, provided is a die plate for resin granulation, in which a plate main body (1) is divided into regions (A to n) for every 360/n (n=4, 6, or 8) degrees, or into first to fourth regions (A to D) for every 90 degrees, and an inner annular heating passage (4) and an outer annular heating passage (5) are formed. A heating medium (F) supplied through a heating medium inlet (2) flows through heating channels (8) only once, and then flows out through a heating medium outlet (3) to an outside.

3 Claims, 7 Drawing Sheets

DIE PLATE FOR RESIN GRANULATION

BACKGROUND OF THE INVENTION

1. Field of the Invention

The present invention relates to a die plate for resin granulation, and more particularly, to a novel improvement for ensuring quality of pellets by eliminating temperature differences among extrusion nozzle holes with use of a heating medium flowing through a heating channel only once and flowing out through a heating medium outlet.

2. Description of the Related Art

In general, a granulation apparatus for obtaining plastic pellets is disposed downstream of an extrusion machine, and includes a die plate having nozzles through which molten resin is extruded, and a cutter device having a cutter blade for cutting the resin extruded from the die plate nozzles into pellets. A surface of the die plate on a side on which the resin is extruded is exposed to circulating water for delivering the cut pellets. Accordingly, in order to maintain the temperature of the resin extrusion nozzles of the die plate, jackets are built therein, through which a heating medium, such as steam or heat transfer oil, flows. In order to perform granulation for obtaining pellets having uniform shapes, it is desired that all of the molten resin extrusion nozzles of the die plate be uniformly heated. Therefore, the heating jackets and the extrusion nozzles are disposed with a given regularity. The heating jacket includes an outer circumferential annular heating passage, an inner circumferential annular heating passage, and heating channels for connecting the outer circumferential annular heating passage and the inner circumferential annular heating passage to each other. The heating channels may be disposed parallel to one another, for example, in a range of ¼ of the circumference (i.e., 90 degrees), ⅙ thereof (60 degrees), or ⅛ thereof (45 degrees).

As an example of a conventionally used die plate for resin granulation of this kind, there is a structure disclosed in Japanese Patent Application Laid-open No. Hei 11-277528, which is illustrated in FIG. 6.

In FIG. 6, a plate main body 1 of a die plate 1A includes an otter annular heating passage 5 formed on an outer circumferential edge of this plate main body 1, and an inner annular heating passage 4 formed on an inner side of this outer annular heating passage 5 so as to have a smaller diameter than that of the outer annular hefting passage 5. The inner and outer annular heating passages 4 and 5 are coaxially disposed.

The outer annular heating passage 5 is partitioned by a plurality of outer walls 5A into first to fourth regions A, B, C, and D with an angular range of 90 degrees. The inner annular heating passage 4 is partitioned into two parts by a pair of inner walls 4A with an angular range of 180 degrees.

In the first and fourth regions A and D of the outer annular heating passage 5, a pair of heating medium inlets 2 into which a heating medium F flows are formed, and, between the second and third regions B and C of the outer annular heating passage 5, one heating medium outlet 3 is formed.

In the respective regions A to D between the outer annular heating passage 5 and the inner annular heating passage 4, nozzle hole groups 7 including a large number of extrusion nozzle holes 6 are disposed. Each of the nozzle hole groups 7 is surrounded by the heating channels 8 and the annular heating passages 4 and 5.

The respective extrusion nozzle holes 6 of each of the nozzle hole groups 7 are disposed in two rows, including a first row 6A and a second row 6B, along a crossing direction E which crosses the circumferential direction of the plate main body 1.

Other than the above-mentioned conventional configuration, there is another conventional configuration as illustrated in FIG. 7.

Specifically, in FIG. 7, portions identical or equivalent to those of FIG. 6 are represented by the same reference symbols, and description thereof is omitted. The regions A to D are respectively formed as closed circuits. The heating medium inlet 2 and the heating medium outlet 3 are formed in each of the outer annular heating passages 5. The nozzle hole groups 7 of each of the regions A to D are partitioned into two parts by the outer wall 5A.

In the above-mentioned conventional configurations, first, in the conventional configuration of FIG. 6, the heating medium F, which has been preheated to a given temperature and supplied through the heating medium inlets 2 in the regions A and D, passes through the heating channels 8 in the regions A and D, and heats the extrusion nozzle holes 6. Moreover, the heating medium F is delivered to a heating device (not shown) through the single heating medium outlet 3 on the lower side after passing through the heating channels 8 in the regions B and C. Then, the heating medium F is heated again to the given temperature, and after that, circulated again into the plate main body 1 through the heating medium inlets 2.

Next, in the another conventional configuration illustrated in FIG. 7, the nozzle hole groups 7 are partitioned into two sections by the outer wall 5A for each of the regions A to D. Accordingly, as indicated by the arrows in each of the regions A to D, the heating medium F, which is supplied through the heating medium inlet 2, heats the plurality of nozzle hole groups 7 in the vicinity of the heating medium inlet 2. After that, the heating medium F heats the plurality of nozzle hole groups 7 in the vicinity of the heating medium outlet 3, and then the heating medium F is returned to the heating device (not shown) through the heating medium outlet 3.

In the conventional die plate for resin granulation configured as described above, the following problems exist.

That is, in the case of the above-mentioned conventional configuration of FIG. 6, the heating medium flows into the outer annular heating passage through the inlets disposed at two upper positions. The heating medium, which has flowed from the upper-right inlet, flows into the heating channel which communicates to the outer annular heating passage and is disposed in the upper-right range of 90 degrees. The heating medium is used for heating the nozzles there, and then flows into the inner annular heating passage. The same heating medium flows into the inner annular heating passage which is disposed in the lower-right range of 90 degrees, and then flows into the heating channel which is disposed in the lower-right range of 90 degrees. The heating medium is used for heating the nozzles, then passes through the outer annular heating passage and flows out through the lower heating medium outlet. In other words, the same heating medium passes through the heating channels twice (to be used for heating the nozzles twice) in this configuration. The heating medium performs heat transfer for heating the nozzles when passing through the heating channels. Therefore, the temperature of the heating medium itself is lowered (the heat energy stored therein is decreased). When the heating medium having the temperature thus lowered is caused to pass through the heating channels again for heating the nozzles, a temperature difference is generated between the vicinity of the heating channels through which the heating medium has passed firstly, and the vicinity of the heating channels through which the heating medium passes secondly. In this example, the temperature of the nozzles in the lower-right range of 90 degrees is lower than the temperature of the nozzles in the upper-right range of 90 degrees.

Reduction of the variations in size and shape of the pellets is an important factor for stabilizing the formability in a succeeding process. In order to obtain uniform pellet shapes having small variations, it is important to minimize the temperature differences among all the nozzle holes in the die plate. When there are variations in temperature of the nozzle holes, the flow rate of a resin passing through the hole having a lower temperature becomes lower so that the size of pellet becomes smaller. On the other hand, the flow rate of a resin passing through the nozzle hole having a higher temperature becomes higher so that the size of pellet becomes larger. In particular, when the size and capacity of the granulation machine become larger, the number of nozzle holes becomes larger so that uniform heating of the nozzle holes becomes an important subject.

In the case of the conventional configuration of FIG. 7, the inlet and outlet for the heating medium are formed in each of the regions, and the heating medium, which has undergone heat exchange with the nozzle hole groups on the inlet side, is recirculated to the nozzle hole groups on the outlet side. Accordingly, there are generated temperature differences between the nozzle hole groups on the inlet and outlet sides so that there are generated variations in shape of molded pellets similarly as described above.

SUMMARY OF THE INVENTION

Therefore, the present invention is directed to perform granulation for obtaining pellets having smaller variations in weight and shape by minimizing temperature variations among all nozzles of a die plate.

According to an exemplary embodiment of the present invention, there is provided a die plate for resin granulation, including: a large number of extrusion nozzle holes disposed in a plate main body, for extruding a molten resin; a large number of heating channels for heating the large number of extrusion nozzle holes; and an outer annular heating passage and an inner annular heating passage for communicating the large number of heating channels to one another, in which the large number of extrusion nozzle holes between the large number of heating channels are disposed along a crossing direction which crosses a circumferential direction of the plate main body, and in which a heating medium flows through the large number of heating channels only once and flows into a heating medium outlet of the plate main body. Further, the die plate for resin granulation further includes: first to n-th regions positioned every 360/n (n=4, 6, or 8) degrees in the plate main body; nozzle hole groups disposed in each of the first to n-th regions and positioned between the large number of heating channels; outer walls and inner walls respectively disposed in the outer annular heating passage and the inner annular heating passage in the first to n-th regions; heating medium outlets positioned between the first to n-th regions and connected to the inner annular heating passage between the inner walls, the heating medium outlets being led to an outside; and heating medium inlets disposed between the outer walls in each of the first to n-th regions. The heating medium supplied through the heating medium inlets passes through the large number of heating channels between the inner walls, and flows out through the heating medium outlets to the outside. Further, the inner walls in the inner annular heating passage are positioned at centers of the fourth to n-th regions in the circumferential direction. Further, the die plate for resin granulation further includes: a first region, a second region, a third region, and a fourth region, which are positioned every 90 degrees in the plate main body; nozzle hole groups disposed in each of the first region, the second region, the third region, and the fourth region and positioned between the large number of heating channels; a first heating medium inlet disposed in the outer annular heating passage in the first region; a second heating medium inlet disposed in the outer annular heating passage in the fourth region; a first X-type three-dimensional passage for connecting, independently in a crossing manner, the outer annular heating passage in the first region to the inner annular heating passage in the second region, and connecting the inner annular heating passage in the first region to the outer annular heating passage in the second region; a second X-type three-dimensional passage for connecting, independently in a crossing manner, the outer annular heating passage in the fourth region to the inner annular heating passage in the third region, and connecting the inner annular heating passage in the fourth region to the outer annular heating passage in the third region; and a heating medium outlet disposed at a lower portion of the outer annular heating passage. The heating medium supplied through the first heating medium inlet in the first region flows through the large number of heating channels in the first region, the first X-type three-dimensional passage, and the outer annular heating passage in the second region to the heating medium outlet. The heating medium supplied through the first heating medium inlet in the first region flows through the outer annular heating passage in the first region, the first X-type three-dimensional passage, and the large number of heating channels in the second region to the heating medium outlet. The heating medium supplied through the second heating medium inlet in the fourth region flows through the large number of heating channels in the fourth region, the second X-type three-dimensional passage, and the outer annular heating passage in the third region to the heating medium outlet. The heating medium supplied through the second heating medium inlet in the fourth region flows through the outer annular heating passage in the fourth region, the second X-type three-dimensional passage, and the large number of heating channels in the third region to the heating medium outlet.

The die plate for resin granulation according to the present invention is configured as described above so that the following advantageous effects can be obtained.

That is, the die plate for resin granulation includes: the large number of extrusion nozzle holes disposed in the plate main body, for extruding a molten resin; the large number of heating channels for heating the large number of extrusion nozzle holes; and the outer annular heating passage and the inner annular heating passage for communicating the large number of heating channels to one another. The large number of extrusion nozzle holes between the large number of heating channels are disposed along a crossing direction which crosses a circumferential direction of the plate main body. The heating medium flows through the large number of heating channels only once and flows into a heating medium outlet of the plate main body. Accordingly, the temperature variations among all the nozzles of the die plate can be minimized so that uniform pellets having smaller variations in weight and shape can be obtained.

Moreover, the die plate for resin granulation further includes: the first to n-th regions positioned every 360/n (n=4, 6, or 8) degrees in the plate main body; the nozzle hole groups disposed in each of the first to n-th regions (A to n) and positioned between the large number of heating channels; the outer walls and the inner walls respectively disposed in the outer annular heating passage and the inner annular heating passage in the first to n-th regions; the heating medium outlets positioned between the first to n-th regions and connected to the inner annular heating passage between the inner walls, the heating medium outlets being led to an outside; and the heating medium inlets disposed between the outer walls in each of the first to n-th regions. The heating medium supplied through the heating medium inlets passes through the large number of heating channels between the inner walls, and flows out through the heating medium outlets to the outside. Accordingly, there are disposed two inlets and one outlet for each region so that the heating medium can be quickly supplied and discharged.

Moreover, the inner walls in the inner annular heating passage are positioned at the centers of the first to n-th regions in the circumferential direction. Accordingly, the heating medium can be quickly supplied to and discharged from the nozzle hole groups across a pair of regions.

Moreover, the die plate for resin granulation further includes: the first region, the second region, the third region, and the fourth region, which are positioned every 90 degrees in the plate main body; the nozzle hole groups disposed in each of the first region, the second region, the third region, and the fourth region and positioned between the large number of heating channels; the first heating medium inlet disposed in the outer annular heating passage in the first region; the second heating medium inlet disposed in the outer annular heating passage in the fourth region; the first X-type three-dimensional passage for connecting, independently in a crossing manner, the outer annular heating passage in the first region to the inner annular heating passage in the second region, and connecting the inner annular heating passage in the first region to the outer annular heating passage in the second region; the second X-type three-dimensional passage for connecting, independently in a crossing manner, the outer annular heating passage in the fourth to the inner annular heating passage in the third region, and connecting the inner annular heating passage in the fourth region (D) to the outer annular heating passage in the third region; and a heating medium outlet disposed at a lower portion of the outer annular heating passage. The heating medium supplied through the first heating medium inlet in the first region flows through the large number of heating channels in the first region, the first X-type three-dimensional passage, and the outer annular heating passage in the second region to the heating medium outlet. The heating medium supplied through the first heating medium inlet in the first region flows through the outer annular heating passage in the first region, the first X-type three-dimensional passage, and the large number of heating channels in the second region to the heating medium outlet. The heating medium supplied through the second heating medium inlet in the fourth region flows through the large number of heating channels in the fourth region, the second X-type three-dimensional passage, and the outer annular heating passage in the third region to the heating medium outlet. The heating medium supplied through the second heating medium inlet in the fourth region flows through the outer annular heating passage in the fourth region, the second X-type three-dimensional passage, and the large number of heating channels in the third region to the heating medium outlet. Accordingly, the heating medium supplied through the side of the pair of inlets of the die plate upper portion passes through the nozzle holes all at once and flows out through the outlet to the outside. With this, the temperatures of the extrusion nozzle holes of the nozzle hole groups can be brought into a nearly constant state.

BRIEF DESCRIPTION OF THE DRAWINGS

In the accompanying drawings.

DETAILED DESCRIPTION OF THE PREFERRED EMBODIMENT

The present invention has an object to provide a die plate for resin granulation in which a heating medium is supplied only once to heating channels of a plate main body, and the heating medium, which has flowed through the heating channels once so that its temperature has been lowered below a predetermined temperature, flows to an outside without flowing into other heating channels, thereby eliminating temperature differences among extrusion nozzle holes so as to maintain quality of pellets.

(Embodiment)
A die plate for resin granulation according to an exemplary embodiment of the present invention is described below with reference to the drawings.

Note that, portions identical with or equivalent to those of the conventional examples are represented by the same reference symbols to be described.

Figure 1:
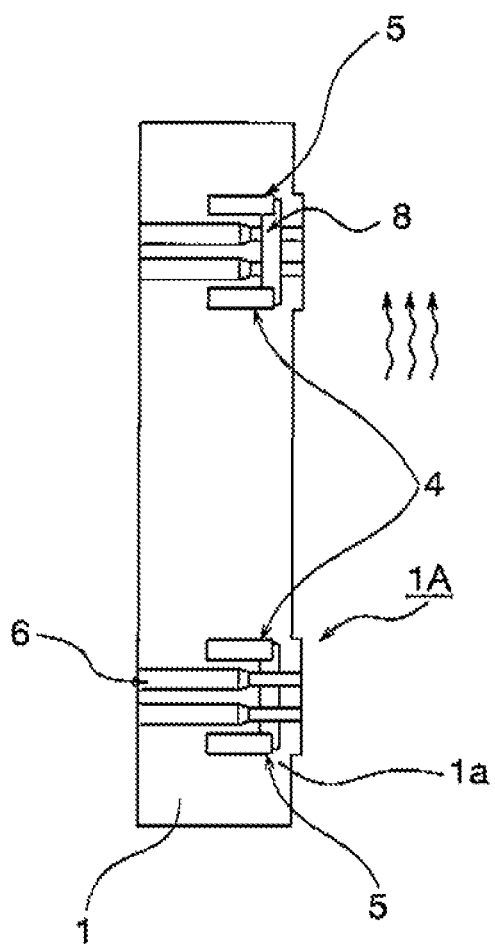
FIG. 1 is a cross-sectional view illustrating a die plate for resin granulation according to an embodiment of the present invention.

FIG. 1 illustrates a die, i.e., a die plate 1A, which is disposed on an extruder (not shown). In this die plate 1A, a large number of extrusion nozzle holes 6 for a molten resin are formed in an annular arrangement. An inner annular heating passage 4 and an outer annular heating passage 5 are formed on the inner and outer sides of the large number of nozzle holes 6 in cross section, respectively.

Figure 2:
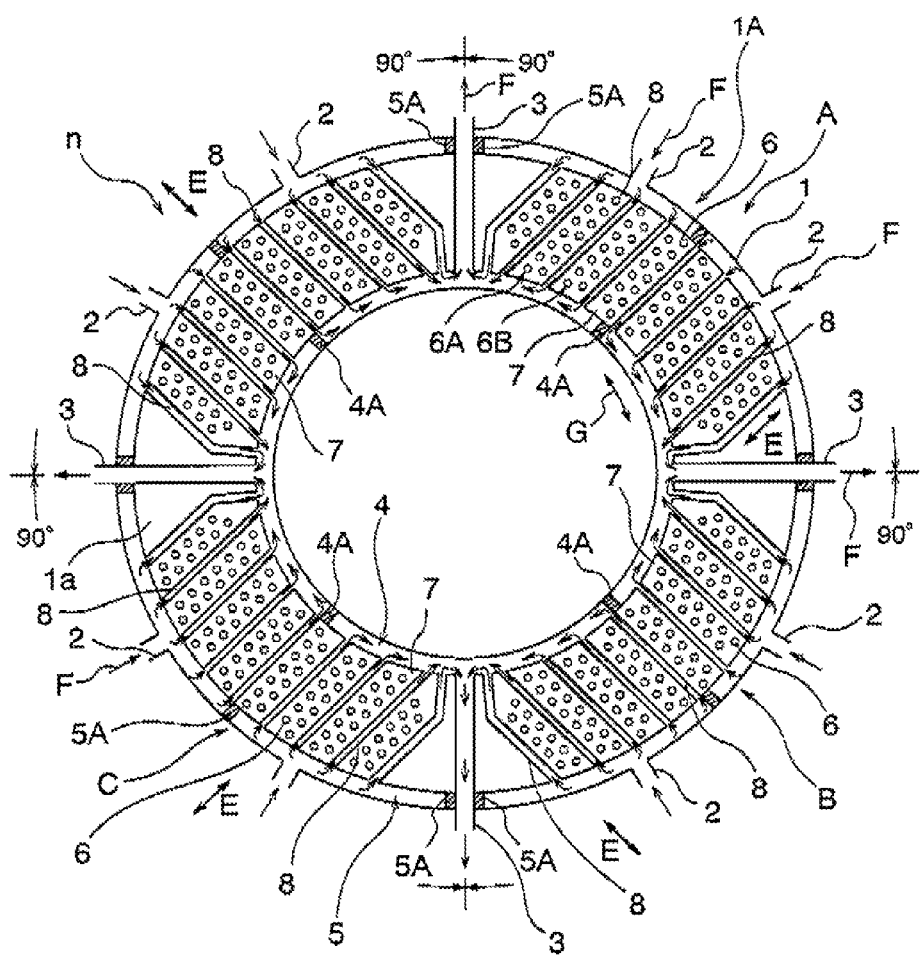
FIG. 2 is an enlarged right side view illustrating a case in which an angular range of each region of FIG. 1 is set to 90 degrees.

FIG. 2 is an enlarged right side view illustrating a configuration of the die plate 1A of FIG. 1 described above in the case where the die plate 1A is divided every 90 degrees, that is, divided by n=4.

In FIG. 2, the die plate 1A includes a plate main body 1. As an exemplary mode, this plate main body 1 is divided into four regions for every 90 degrees, i.e., first to n-th regions A, B, C, and n. On a circumferential edge 1a of the plate main body 1, a pair of heating medium inlets 2 for supplying a heating medium F to the inside are disposed every 90 degrees.

As described above, although the plate main body 1 is divided into the respective regions A to n, the inner annular heating passage 4 and the outer annular heating passage 5 are disposed so as to form an annular shape as a whole. The heating medium inlets 2 are formed in the outer annular heating passage 5, and heating medium outlets 3 communicating to the inner annular heating passage 4 are formed in the first to fourth regions A to n of the plate main body 1, respectively. The heating medium inlets 2, 2 in each of the regions A to n in the outer annular heating passage 5 are partitioned therebetween by an outer wall 5A. Moreover, an inner wall 4A is disposed at a central position of each of the regions A to n in the circumferential direction of the inner annular heating passage 4, and the respective heating medium outlets 3 are positioned between the respective inner walls 4A.

In each of the regions A to n of the plate main body 1, there are formed nozzle hole groups 7, in which the large number of extrusion nozzle holes 6 are grouped. The extrusion nozzle holes 6 of each of the nozzle hole groups 7 are disposed in at least two rows, including a first row 6A and a second row 6B, along a direction E which crosses the circumferential direction of the plate main body 1. A heating channel 8 is formed between the respective nozzle hole groups 7.

Accordingly, each of the nozzle hole groups 7 in the respective regions A to n is surrounded by the outer annular heating passage 5, the respective heating channels 8, and the inner annular heating passage 4.

In the configuration of the present invention described above, the heating medium F, such as steam or a heat transfer oil (most suitable for using a heating oil), which has been heated in advance to a predetermined temperature by a heating apparatus (not shown), is supplied through the respective pairs of heating medium inlets 2 of the respective regions A to n. The heating medium F thus supplied passes through the outer annular heating passage 5, the respective heating channels 8, and the inner annular heating passage 4, as indicated by the arrows of FIG. 2. Then, the heating medium F flows out through the heating medium outlets 3, and returns to a heating source apparatus (not shown). The heating medium F is heated again to the predetermined temperature, and is returned again to the heating medium inlets 2.

In the above-mentioned flow of the heating medium F in the plate main body 1, as described above, the heating medium F, which has been heated in advance to the predetermined temperature by the heating source apparatus, enters the heating medium inlets 2, passes through the outer annular heating passage 5, and flows into the respective heating channels 8 in a distributed manner. After that, the heating medium F flows out of the heating channels 8, passes through the inner annular heating passage 4, and then passes through the heating medium outlets 3. Then, the heating medium F is discharged outside the die plate 1A. The heating medium F passes through the vicinities of the extrusion nozzle holes 6 through the respective heating channels 8 only once. Accordingly, the heating medium F, whose temperature has been lowered when passing through the heating channels 8 once, is not directly supplied again to the vicinities of the nozzle holes 6 through other heating channels 8. That is, the same heating medium F does not pass through the vicinities of the nozzle holes 6 twice through the heating channels 8. Accordingly, the temperature differences among all the nozzle holes 6 can be suppressed to a lower level. Thus, a stable extrusion of strands without clogging can be performed, thereby achieving granulation for obtaining pellets with stable quality.

In other words, the heating medium F, which has been returned after being supplied to the heating channels 8 once, has a lowered temperature compared to the predetermined temperature. However, the heating medium F having the lowered temperature is not directly returned to other heating channels 8 again, but is heated by the heating source apparatus again to the predetermined temperature before being supplied to the heating channels 8. Accordingly, the heating medium F, which has been used for heating once, is not directly used again for the next heating so that the temperature differences among the extrusion nozzle holes 6 can be prevented.

Figure 3:
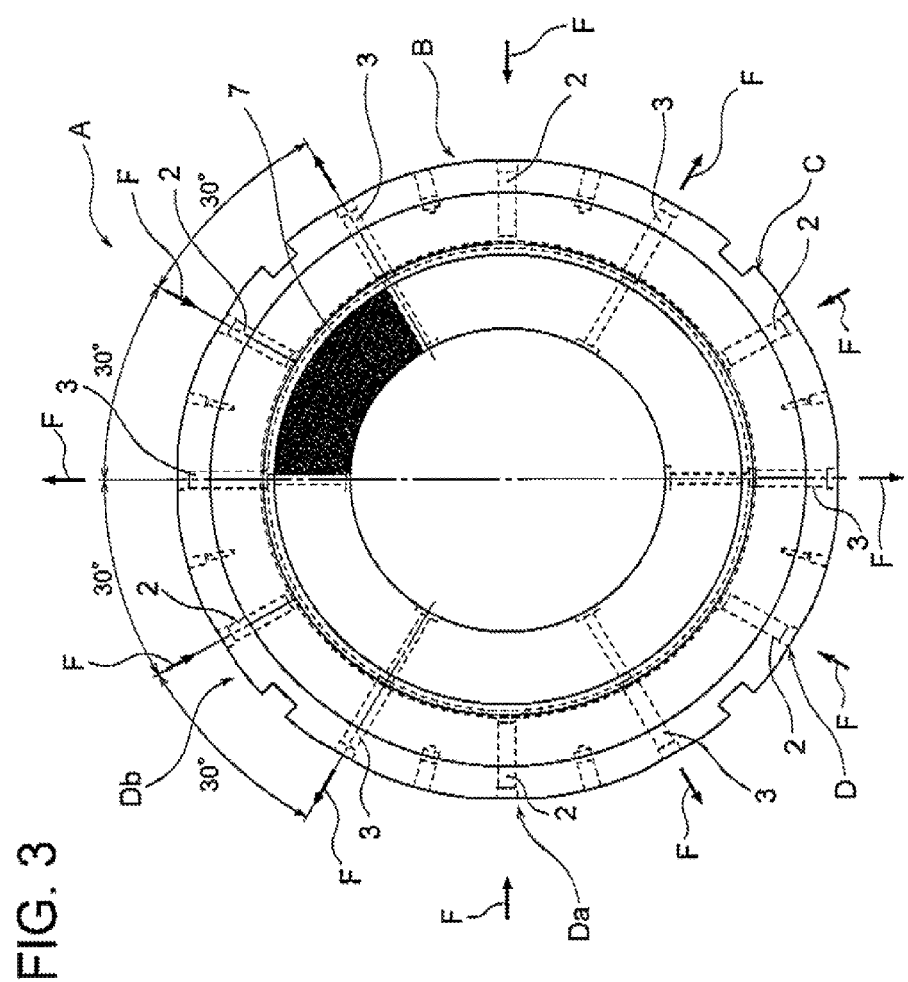
FIG. 3 is an enlarged right side view illustrating a case in which an angular range of each region is set to 60 degrees in the same configuration as that of FIG. 2.
Figure 4:
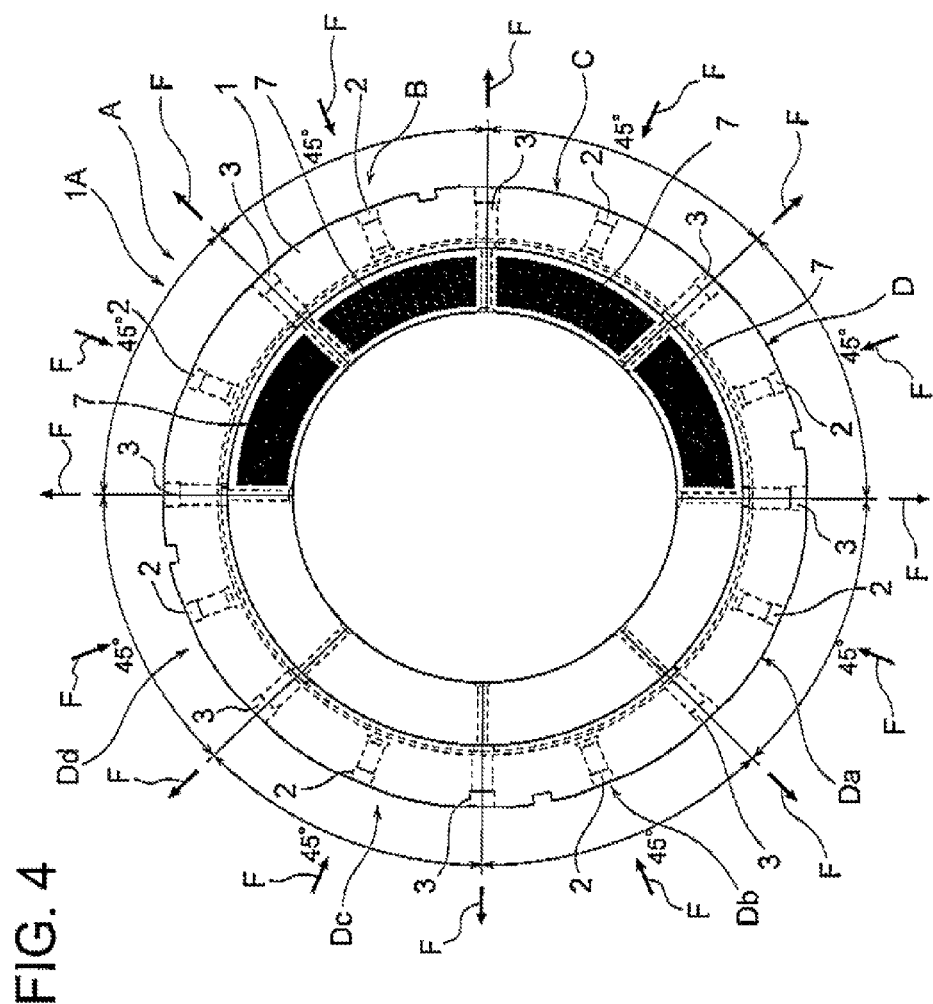
FIG. 4 is an enlarged right side view illustrating a case in which an angular range of each region is set to 45 degrees in the same configuration as that of FIG. 2.

Note that, FIGS. 3 and 4 illustrate other configurations of FIG. 1. In the configuration of FIG. 3, the angular range of each region is set to 60 degrees so as to form first to n-th regions A, B, C, D, Da, and n. In the configuration of FIG. 4, the angular range of each region is set to 45 degrees so as to form first to n-th regions A, B, C, D, Da, Db, Dc, and n.

Accordingly, in the configurations of FIGS. 1 to 4, the division range for each region is defined by 360/n degrees (n=4, 6, or 8).

Figure 5:
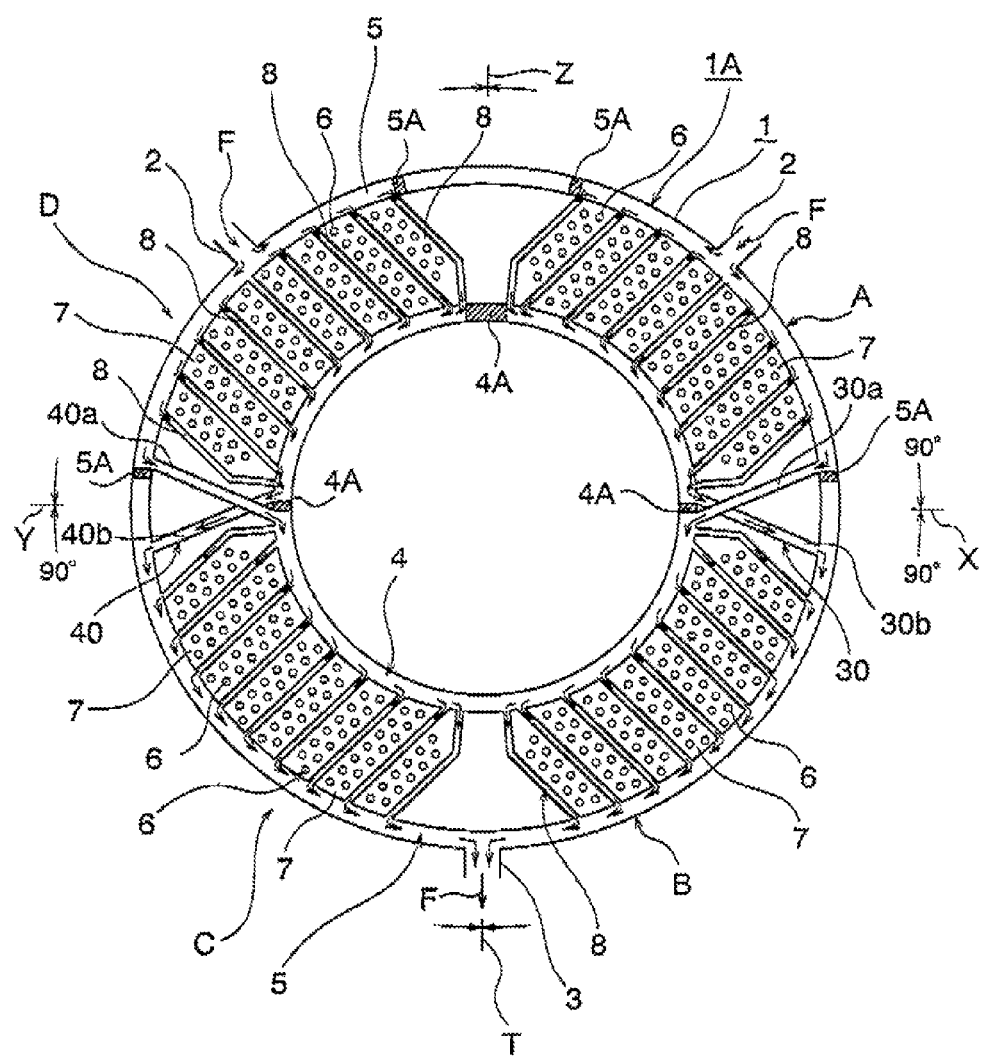
FIG. 5 is a side view illustrating another mode of FIG. 2.
Figure 6:
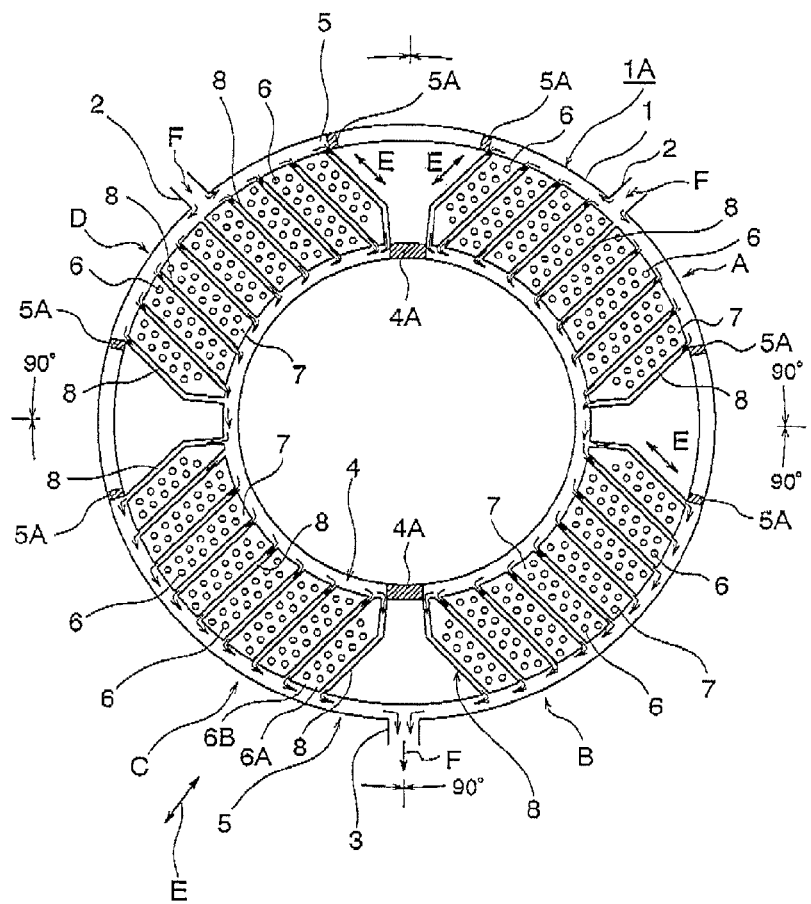
FIG. 6 is a side view illustrating a conventional die plate for resin granulation.
Figure 7:
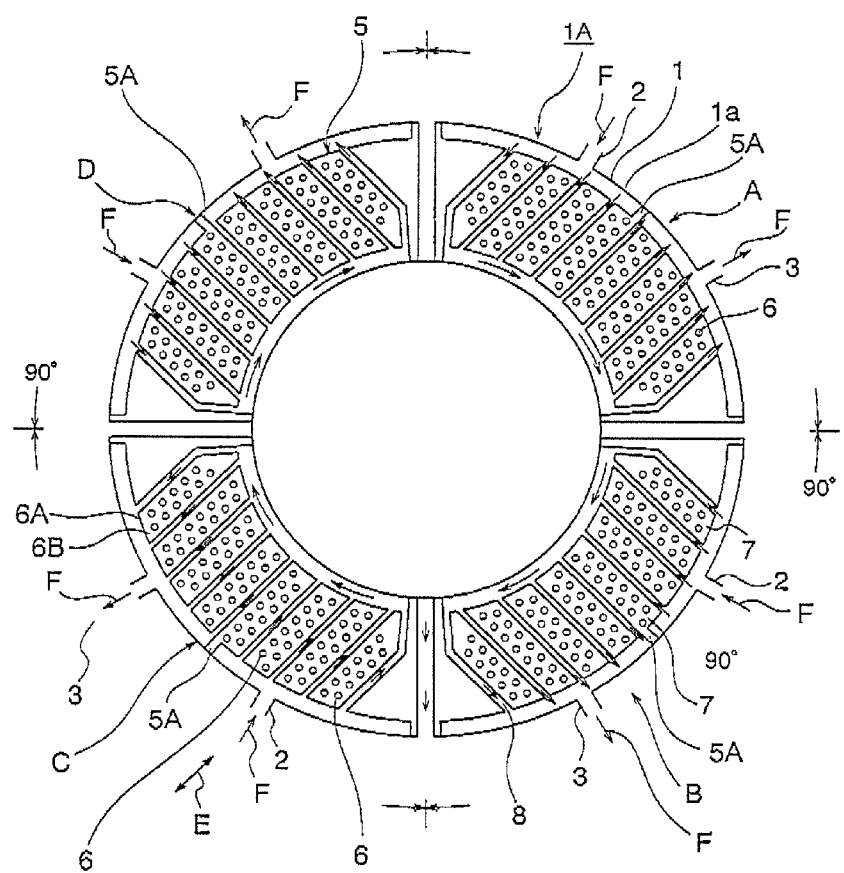
FIG. 7 is a side view illustrating another mode of the conventional die plate for resin granulation.

Next, FIG. 5 illustrates another mode of the configurations of FIGS. 2 to 4. Portions identical with or equivalent to those of FIG. 2 are represented by the same reference symbols to be described.

The plate main body 1 is divided into first to fourth regions A to D which are formed every 90 degrees. The outer walls 5A are disposed on the end portion side of the first and fourth regions A and D of the outer annular heating passage 5 so as to block the passage. Moreover, the outer walls 5A are disposed at a boundary X between the first and second regions A and B, and a boundary Y between the third and fourth regions C and D, so as to block the passage.

In the inner annular heating passage 4, the inner wall 4A is disposed at a position corresponding to a boundary Z between the first and fourth regions A and D so as to block the passage, and the inner walls 4A are disposed at positions corresponding to the boundaries X and Y in the inner annular heating passage 4 so as to block the passage.

In the lower portion of the outer annular heating passage 5, the only heating medium outlet 3 for this plate main body 1 is disposed at a boundary T between the second and third regions B and C. The heating medium F supplied through the heating medium inlets 2, which are respectively disposed in the outer annular heating passage 5 in the first and fourth regions A and D, is discharged from the heating medium outlet 3.

First and second three-dimensional flow passages 30 and 40 are disposed at the positions corresponding to the boundaries X and Y, and include first flow passages 30a and 40a and second flow passages 30b and 40b which are respectively disposed independently from each other in an X shape.

Accordingly, the outer annular heating passage 5 in the first region A communicates to the inner annular heating passage 4 in the second region B through the first flow passage 30a. The inner annular heating passage 4 in the first region A communicates to the outer annular heating passage 5 in the second region B through the second flow passage 30b.

The outer annular heating passage 5 in the fourth region D communicates to the inner annular heating passage 4 of the third region C through the first flow passage 40a. The inner annular heating passage 4 in the fourth region D communicates to the outer annular heating passage 5 of the third region C through the second flow passage 40b.

In other words, the heating medium F, which has flowed through the respective heating channels 8 in the first region A once, flows into the heating medium outlet 3 without flowing into the heating channels 8 in the other regions. The heating medium F flowing into the outer annular heating passage 5 in the first region A flows through the respective heating channels 8 in the second region B only once and flows into the heating medium outlet 3.

The heating medium F, which has flowed through the respective heating channels 8 in the fourth region D once, flows into the heating medium outlet 3 without flowing into the heating channels 8 in the other regions.

Note that, in another mode of the configuration of FIG. 5, instead of the above-mentioned configuration which uses a heating oil, steam is used for the heating. In this case, the angles of the regions A to D are optimally set to 90 degrees as illustrated in FIG. 5.

That is, in the die plate 1A of the configuration of FIG. 5, when the die plate 1A is disposed so that the vertically upper side is located at the upper portion of the drawing sheet of FIG. 5, the heating medium flow passages (including the outer annular heating passage 5, the heating channels 8, and the inner annular heating passage 4) of the die plate 1A are directed vertically downward over the substantially entire area. Accordingly, when heated steam is used as the heating medium, the steam flows downward as the steam loses its heat. Thus, no reverse flow of the heating medium due to a convection flow is generated, and no blocking of the flow passage due to condensed water droplets is caused.

The configuration of FIG. 5 and its operation described above are summarized as follows.

That is, the die plate for resin granulation of FIG. 5 includes: the first region A, the second region B, the third region C, and the fourth region D, which are positioned every 90 degrees in the plate main body 1; the nozzle hole groups 7 disposed in each of the first region A, the second region B, the third region C, and the fourth region D and positioned between the heating channels 8; the heating medium inlet 2 disposed in the outer annular heating passage 5 in the first region A; the heating medium inlet 2 disposed in the outer annular heating passage 5 in the fourth region D; the first X-type three-dimensional passage 30 for connecting, independently in a crossing manner, the outer annular heating passage 5 in the first region A to the inner annular heating passage 4 in the second region B, and connecting the inner annular heating passage 4 in the first region A to the outer annular heating passage 5 in the second region 3; the second X-type three-dimensional passage 40 for connecting, independently in a crossing manner, the outer annular heating passage 5 in the fourth region D to the inner annular heating passage 4 in the third region C, and connecting the inner annular heating passage 4 in the fourth region D to the outer annular heating passage 5 in the third region C; and the heating medium outlet 3 disposed at the lower portion of the outer annular heating passage 5. The heating medium F supplied through the heating medium inlet 2 in the first region A flows through the heating channels 8 in the first region A, the first X-type three-dimensional passage 30, and the outer annular heating passage 5 in the second region B to the heating medium outlet 3. The heating medium F supplied through the heating medium inlet 2 in the first region A flows through the outer annular heating passage 5 in the first region A, the first X-type three-dimensional passage 30, and the heating channels 8 in the second region B to the heating medium outlet 3. The heating medium F supplied through the heating medium inlet 2 in the fourth region D flows through the heating channels 8 in the fourth region D, the second X-type three-dimensional passage 40, and the outer annular heating passage 5 in the third region C to the heating medium outlet 3. The heating medium F supplied through the heating medium inlet 2 in the fourth region D flows through the outer annular heating passage 5 in the fourth region D, the second X-type three-dimensional passage 40, and the heating channels 8 in the third region C to the heating medium outlet 3.

Accordingly, in each of the modes of FIGS. 2 to 5, the heating medium F supplied through the heating medium inlet 2 flows through the heating channels 8 only once, and the heating medium F, which has passed through the heating channels 8 once, does not pass through the heating channels 8 again. Accordingly, the temperature differences among the respective extrusion nozzle holes 6 in the entire plate main body 1 can be prevented or minimized.

According to the present invention, it is possible to reduce temperature variations even when a plate main body including a large number of extrusion nozzles is used, thereby greatly contributing to the manufacture of pellets with stable quality.

What is claimed is:

1. A die plate for resin granulation, comprising:
a plurality of extrusion nozzle holes disposed in a plate main body, for extruding a molten resin;
a plurality of heating channels for heating the extrusion nozzle holes; and
an outer annular heating passage and an inner annular heating passage for communicating the heating channels with one another,
wherein the extrusion nozzle holes between the heating channels are disposed along a crossing direction (E) which crosses a circumferential direction of the plate main body,
wherein the die plate further comprises:
first to n-th regions (A to n) positioned every 360/n degrees in the plate main body, where n=4, 6 or 8;
nozzle hole groups disposed in each of the first to n-th regions (A to n) and positioned between the heating channels;
outer walls and inner walls respectively disposed in the outer annular heating passage and the inner annular heating passage in the first to n-th regions (A to n);
a plurality of heating medium outlets positioned between the first to n-th regions (A to n) and connected to the inner annular heating passage between the inner walls, the heating medium outlets being led from the inner annular heating passage, between the outer walls in the outer annular heating passage and outwardly of the outer annular heating passage; and
a plurality of heating medium inlets disposed between the outer walls in each of the first to n-th regions (A to n),
wherein a heating medium flows through the heating channels only once so that the temperature of the heating medium is lowered below a predetermined temperature, and then the heating medium flows into the heating medium outlets of the plate main body,
wherein the heating medium outlets are communicated with a heating source apparatus so that the heating medium can be heated to the predetermined temperature and returned to the heating medium inlets of the plate main body, and
wherein the heating medium supplied through the heating medium inlets passes through the heating channels between the inner walls, and flows out through the heating medium outlets to the outside.

2. A die plate for resin granulation according to claim 1, wherein the inner walls in the inner annular heating passage are positioned at centers of the first to n-th regions (A to n) in the circumferential direction (G).

3. A die plate for resin granulation, comprising:
a plurality of extrusion nozzle holes, disposed in a plate main body, for extruding a molten resin;
a plurality of heating channels for heating the extrusion nozzle holes; and
an outer annular heating passage and an inner annular heating passage for communicating the heating channels with one another,
wherein the extrusion nozzle holes between the heating channels are disposed along a crossing direction (E) which crosses a circumferential direction of the plate main body, and
wherein a heating medium (F) flows through the heating channels only once and flows into a heating medium outlet of the plate main body,
the die plate further comprising:
a first region (A), a second region (B), a third region (C), and a fourth region (D), which are positioned every 90 degrees in the plate main body;
nozzle hole groups disposed in each of the first region (A), the second region (B), the third region (C), and the fourth region (D) and positioned between the heating channels;

a first heating medium inlet disposed in the outer annular heating passage in the first region (A);

a second heating medium inlet disposed in the outer annular heating passage in the fourth region (D);

a first X-type three-dimensional passage for connecting, independently in a crossing manner, the outer annular heating passage in the first region (A) to the inner annular heating passage in the second region (B), and connecting the inner annular heating passage in the first region (A) to the outer annular heating passage in the second region (B);

a second X-type three-dimensional passage for connecting, independently in a crossing manner, the outer annular heating passage in the fourth region (D) to the inner annular heating passage in the third region (C), and connecting the inner annular heating passage in the fourth region (D) to the outer annular heating passage in the third region (C); and a heating medium outlet disposed at a lower portion of the outer annular heating passage, wherein the heating medium (F) supplied through the first heating medium inlet in the first region (A) flows through the heating channels in the first region (A), the first X-type three-dimensional passage, and the outer annular heating passage in the second region (B) to the heating medium outlet, wherein the heating medium (F) supplied through the first heating medium inlet in the first region (A) flows through the outer annular heating passage in the first region (A), the first X-type three-dimensional passage, and the heating channels in the second region (B) to the heating medium outlet, wherein the heating medium (F) supplied through the second heating medium inlet in the fourth region (D) flows through the heating channels in the fourth region (D), the second X-type three-dimensional passage, and the outer annular heating passage in the third region (C) to the heating medium outlet, and wherein the heating medium (F) supplied through the second heating medium inlet in the fourth region (D) flows through the outer annular heating passage in the fourth region (D), the second X-type three-dimensional passage, and the heating channels in the third region (C) to the heating medium outlet.

* * * * *